United States Patent Office 2,906,786
Patented Sept. 29, 1959

2,906,786
PRODUCTION OF DURENE AND PSEUDOCUMENE

Joe G. Hendrickson, Texas City, Tex., assignor to The American Oil Company, Texas City, Tex., a corporation of Texas No Drawing. Application March 22, 1956
Serial 573,073

6 Claims. (Cl. 260—668)

This invention relates to a process for producing durene and pseudocumene, and in particular it concerns a method for producing these compounds from resinous polycondensation products of the formolite type.

Polymethylbenzenes such as durene and pseudocumene are highly desirable chemical intermediates. Durene may be oxidized to pyromellitic anhydride which in turn is esterified and employed as a superior ingredient of protective coating compositions, as a plasticizer, or for many other uses. Likewise pseudocumene may be oxidized to trimellitic acid or anhydride which may also be esterified and employed for similar purposes. The large amounts of durene required for such uses have created a need for a simple and inexpensive process for its synthesis.

An object of this invention is to provide a process for producing durene from resinous polycondensation products of the formolite type. Another object is to convert resinous polycondensation products of xylenes with formaldehyde into durene and pseudocumene selectively, with the formation of only minor amounts of isomers of the latter compounds. A further object is to provide a process for converting inexpensive raw materials i.e. mixed xylenes and formaldehyde, into high purity durene and pseudocumene in a simple and economic manner. Other objects and advantages of this invention will be apparent from the detailed description thereof.

It has been found that durene and pseudocumene are produced as the primary conversion products when certain defined resinous polycondensation products of the formolite type are decomposed under hydro-cracking conditions in the presence of a solid catalyst. The polycondensation products are those prepared by the condensation of mixed xylenes with formaldehyde. They are resinous materials which correspond with a product having an average of 5 xylyl radicals or more in its molecule. A typical useful polycondensation product has an average molecular weight between about 550 and 600, and as such would correspond with the polycondensation product of 5 xylene molecules and 4 molecules of formaldehyde. The decomposition of the resinous polycondensation product is carried out under hydrocracking conditions, which include a temperature between about 300° and 600° C., preferably between about 400° and 500° C., in the presence of between about 2 and 50 moles of hydrogen, preferably 5 to 25, per mol of polycondensation product while using a solid catalyst which has hydrogenation activity. Commercial hydrogenation-dehydrogenation catalysts such as chromia-alumina, molybdena-alumina, cobalt oxide-molybdena-alumina, platinum-alumina, and the like may be used. It is preferred to employ a molybdena-alumina catalyst of the type that is frequently employed in hydroforming petroleum naphthas. The hydrocracking reaction may be carried out under a pressure of 50 to 1000 p.s.i.g., e.g., 100 p.s.i.g., and at a space velocity between about 0.1 and 10, preferably between 0.5 and 2, liquid volumes of polycondensation product/hour/volume of catalyst.

The durene and pseudocumene which are produced as the primary conversion products upon hydrocracking the resinous polycondensation product are recoverable from the hydrocracking products by conventional means such as fractionation.

The resinous polycondensation product which is decomposed, in accordance with this process, to produce durene and pseudocumene is one prepared by condensing mixed xylenes with formaldehyde (formolite reaction) in a manner known to the art. The individual pure xylene isomers are not employed in this reaction, although pure m-xylene may be used if desired though it is not economical to do so. Other hydrocarbons such as ethylbenzene and paraffinic hydrocarbons (it is preferred to remove olefinic hydrocarbons before carrying out the formolite reaction) may be present in the xylene mixture used. Suitable xylene mixtures are those such as are recovered from coke oven operations, the hydrogenation of coal, or fractions recovered from petroleum distillates. Commercial xylene fractions, such as are obtained by the solvent extraction of a hydroformed naphtha followed by fractionation thereof to segregate the xylene fraction, are satisfactory. A typical solvent extract of the xylene fraction of hydroformate will contain 19% ethylbenzene, 16% p-xylene, 42% m-xylene, 21% o-xylene, and 2% paraffins. The aromatic content of commercial xylene mixtures such as may be used may have between 7 and 24% ethylbenzene, 7 to 19% paraxylene, 40 to 60% m-xylene, and 17 to 28% o-xylene. Suitable xylene mixtures are also prepared by hydroforming a 115° to 132° C. boiling range fraction of virgin naphtha and then distilling the hydroformed naphtha to recover the xylene fraction boiling in the range of 132° to 150° C. The product which coils in this latter range will contain 90 to 95% $C_8$ aromatic hydrocarbons, the remainder being paraffinic hydrocarbons.

The condensation of xylenes with formaldehyde is usually carried out in the presence of an acid type catalyst such as a mineral acid, an organic acid, or a Friedel-Crafts metal halide. Typical catalysts which are useful in effecting the reaction are sulfuric acid, hydrogen fluoride, toluenesulfonic acid, benzenesulfonic acid, alkanesulfonic acids, formic acid, aluminum chloride, ferric chloride, boron trifluoride, etc. Various catalysts and the manner in which the formolite reaction is carried out are described in U.S. 2,216,941 to A. H. Gleason, and a publication in Ind. Eng. Chem., vol. 32, pages 306–7 (1940) by S. C. Fulton et al.

A very satisfactory method for preparing the formolite type polycondensation products consists of heating formic acid and paraformaldehyde until the latter is dissolved, then adding xylenes as quickly as possible and heating the mixture, preferably refluxing it, with stirring for about 5–6 hours. The formic acid should have a concentration between 90 and 100%, preferably 95–98%, to obtain high yields of the higher molecular weight polycondensation product. Similarly the use of larger amounts of formic acid improves the yield of condensation products, especially those of higher molecular weight. Usually at least about 1 part of formic acid is employed per part by weight of xylenes, and the weight ratio of formic acid to xylenes is preferably about 2:1. The xylenes and formaldehyde are generally employed in about an equimolar ratio in carrying out the reaction in order to obtain the higher molecular weight condensation products.

A preferred method for preparing the polycondensation products is to condense the mixture of xylenes and ethylbenzene with formaldehyde, in a molar ratio of approximately four or more moles of the aromatic mixture per mole of formaldehyde. After removing the unreacted xylene and ethylbenzene from the dixylyl methane which is produced, additional formaldehyde is added and the dixylyl methane further condensed to prepare the high molecular weight condensation product.

After the formolite reaction has been effected, the formic acid layer is separated. Unreacted xylenes and lower molecular weight condensation products are distilled, usually under vacuum. Lower molecular weight condensation products are distilled from the total reaction products until the residue corresponds with a product having an average of at least 5 xylyl radicals or more per molecule. It may be one which corresponds with a product having an average of about 5 to 10 xylyl radicals per molecule. Stated in a different fashion, the distillation is continued until the residue (which is the desired polycondensation product) is one having an average molecular weight of at least about 550 to 600, or as high as 1000–1200. A typical suitable polycondensation product residue would theoretically be envisioned as a large polymer having 5 xylene molecules linked to each other by 4 methylene bridges. This high molecular weight polycondensation product is a resinous highly viscous light colored material. It is essential to employ the defined high molecular weight polycondensation product in this invention rather than a low molecular weight condensation product such as dixylylmethane, since the latter material decomposes during the hydrocracking step to yield xylene and pseudocumene rather than the desired durene and pseudocumene. A more detailed description of the formic acid catalyzed formolite reaction is provided in U.S. 2,597,159 to P. D. May.

Before hydrocracking, the resinous polycondensation product is preferably (although not necessarily) diluted with from about 5 to 50% of a low boiling aromatic solvent such as benzene, toluene, or xylene to reduce its viscosity and facilitate its handling. The polycondensation product is then heated and decomposed under hydrocracking conditions to yield durene and pseudocumene. The hydrocracking is usually carried out at a temperature of 300° to 600° C., preferably 400° to 500° C. At temperatures appreciably lower than 300° C., very little hydrocracking occurs; whereas at temperatures higher than 600° C., an undesiably large amount of demethylation, isomerization, and other undesirable reactions take place. Between about 2 and 50, usually from 5 to 25 mols of hydrogen per mol of polycondensation product are employed in the hydrocracking reaction. This amount is at least sufficient to saturate the methylene linkages which are decomposed in the hydrocracking reaction. While a reaction pressure between 50 and 100 p.s.i.g. may be used, the use of pressures near the low end of this range are preferred since a lesser amount of the isomerization products of durene and pseudocumene are produced. Thus a pressure of from about 50 to 500 p.s.i.g. e.g. 100 p.s.i.g. is preferred. A space velocity between about 0.1 and 10, preferably between about 0.5 and 2 liquid volumes of polycondensation product/hour/volume of catalyst is used.

A solid catalyst which has hydrogenation-dehydrogenation activity is used to facilitate the hydrocracking decomposition of the polycondensation product. Commercial hydrogenation-dehydrogenation catalysts such as chromia-alumina, molybdena-alumina, tungstia-alumina, tungsten nickel sulfide, cobalt oxide-alumina, cobalt oxide-molybdena-alumina, platinum-alumina, vanadia-alumina, and others which also are commercially available can be used. These catalysts are obviously not equal in their ability to catalyze the hydrocracking of the polycondensation product. Molybdena-alumina catalyst, such as is used in the hydroforming of petroleum naphthas to improve their octane number ("hydroforming" being a term applied to processes such as described in U.S. 2,320,147, U.S. 2,388,536 etc.) is a preferred catalyst. This catalyst may be prepared by any of the many techniques known in the art. The molybdena may be incorporated in the alumina catalyst base in any known manner e.g. by impregnation, coprecipitation, cogelling and/or absorption. The catalyst base and/or finished catalyst may be heat stabilized by methods heretofore used in the preparation of hydroforming catalysts. A typical molybdena on alumina catalyst which may be used will have from 5 to 15% of molybdena e.g. 9%, the remainder being activated alumina with minor amounts of impurities or added agents. Methods of preparing molybdena on alumina catalysts are described in detail in patents such as U.S. Reissue 22,196, U.S. 2,404,024, U.S. 2,454,724, U.S. 2,410,558 and others.

The molybdena-alumina catalyst may be activated, prior to use in the hydrocracking reaction, by a reducing treatment. Hydrogen, carbon monoxide, mixtures thereof or other reducing gases may be employed at temperatures of 350° to 750° C. in reducing partially the hexavalent molybdena contained in the molybdena on alumina catalyst. The activation appears to reduce the isomerization tendency of the catalyst and thus reduces the production of the undesired durene and pseudocumene isomers.

In a typical embodiment of this invention a polycondensation product of mixed xylenes with formaldehyde, which has a molecular weight of about 575 (corresponding theoretically to the condensation of 5 xylene molecules with 4 molecules of formaldehyde), is diluted with about an equal part of benzene and heated to a temperature of about 450° C. It is then passed, along with 10 mols of heated hydrogen per mol of polycondensation product, into a hydrocracking reactor. The polycondensation product is there hydrocracked to primarily durene and pseudocumene while employing a temperature of about 450° C., a pressure of about 100 p.s.i.g., a space velocity of about one volume of polycondensation product/hour/volume of catalyst, while employing a molybdena-alumina catalyst containing about 9% molybdena. The hydrocracking products, after removal from the hydrocracking reactor, are cooled, the gas separated in a gas separator, and the liquid product recovered and fractionated to recover a durene fraction and a pseudocumene fraction relatively free of isomers thereof. Unreacted polycondensation product may be recovered as a bottoms from the fractionation and recycled along with the gas stream (which is principally hydrogen) to the hydrocracking reactor.

Laboratory experiments were carried out which demonstrate that in order to produce durene and pseudocumene as the primary hydrocracking products, it is critically important that a high molecular weight polycondensation product (containing an average of about 5 xylyl radicals) rather than the low molecular weight simple condensation product (dixylylmethane) be used. In Runs 1 and 2 a polycondensation product of mixed xylenes with formaldehyde and which had an average molecular weight of 570 (which corresponds theoretically to a condensation product having approximately 5 xylene molecules linked by 4 methylene bridges) was dissolved in an equal weight of benzene and hydrocracked at 450° C., a pressure of 100 p.s.i.g., over a commercial molybdena on alumina catalyst containing about 9% molybdena. In Run 1 a space volecity of about 0.6 liquid volumes of polycondensation product/hour/volume of catalyst was used and approximately 200 mols of hydrogen per mol of polycondensation product was employed. In Run 2 the space velocity was about 2.4 liquid volumes of polycondensation product/hour/volume of catalyst and approximately 50 mols of hydrogen per mol of polycondensation product were introduced into the reactor. In Run 3 dixylylmethane (prepared by condensing two mols of metaxylene with one mol of formaldehyde) was diluted with an equal weight of metaxylene and hydrocracked over the defined molybdena on alumina catalyst at a temperature of 525° C., a pressure of 100 p.s.i.g., a space velocity of 1.5 liquid volumes of dixylylmethane/hour/volume of catalyst using about 30 mols of hydrogen/mol of dixylylmethane, the hydrocracking products were collected, the gas removed and the amounts of various aromatic hydrocarbons in the liquid products were determined by infrared analysis. The results, which are typical of those usually obtained, are shown in Table I which follows:

*Table I*

| Run No | 1 | 2 | 3 |
|---|---|---|---|
| Feed | [1] A | [1] A | [1] B |
| Percent conversion, weight percent | 78 | 50 | 100 |
| Product composition of $C_7+$, weight percent: | | | |
| Toluene | 0.3 | 0.4 | 0.8 |
| o-Xylene | 0.6 | 0.4 | 2.0 |
| m-Xylene | 7.5 | 7.5 | 69.0 |
| p-Xylene | 0.9 | 1.1 | 3.0 |
| Mesitylene | 1.3 | 1.2 | 0.6 |
| Hemimellitene | 2.6 | 1.8 | 1.2 |
| Pseudocumene | 36.0 | 12.3 | 16.3 |
| Durene | 21.4 | 11.4 | 1.0 |
| Isodurene | 2.1 | 0.5 | 0.5 |
| Unconverted | 22.3 | 49.9 | |

[1] Feedstock A—polycondensation product of mixed xylenes and formaldehyde, having M.W. of 570.
[2] Feedstock B—dixylylmethane prepared by condensing m-xylene with formaldehyde.

It will be noted that substantial amounts of durene were contained in the products from Runs 1 and 2 whereas an insignificant amount was produced in Run 3. It should also be noted that the durene and pseudocumene produced were relatively free of their isomers. This surprising advantage of this process enables their recoverage in good purity by precise fractionation. The reason why the polycondensation product used in Runs 1 and 2 should decompose to yield pseudocumene and durene as the primary products rather than pseudocumene and xylene (as is the case in Run 3) is not understood. According to the theorized method of decomposition, no durene would be expected in the hydrocracking products; instead the primary products were expected to be pseudocumene and xylenes.

Thus having described the invention what is claimed is:

1. A process for producing durene and pseudocumene which comprises contacting a resinous formolite type polycondensation product of mixed xylenes with formaldehyde, said polycondensation product corresponding with a product having an average of at least about 5 xylyl radicals per molecule, with a solid catalyst in the presence of hydrogen under hydrocracking conditions and thereby effecting decomposition of the polycondensation product into methylbenzenes, and recovering durene and pseudocumene from the hydrocracking products.

2. The process of claim 1 wherein the polycondensation product has an average molecular weight between about 550 and 600.

3. The process of claim 1 wherein the hydrocracking reaction is carried out at a temperature between about 300° and 600° C. in the presence of between about 2 and 50 mols of hydrogen per mol of polycondensation product.

4. The process of claim 1 wherein said polycondensation product is dissolved in a low boiling aromatic solvent selected from the class consisting of benzene, toluene, and xylene before subjecting the polycondensation product to the hydrocracking reaction.

5. The process of claim 1 wherein the catalyst is comprised essentially of a minor proportion of molybdena extended upon a major proportion of an alumina support.

6. A process for producing durene and pseudocumene which comprises contacting a resinous polycondensation product of mixed xylenes with formaldehyde, said polycondensation product having an average molecular weight between about 550 and 600, with a catalyst comprised essentially of a minor proportion of molybdena extended upon a major proportion of an alumina support under hydrocracking conditions comprising a temperature between about 400° and 500° C. in the presence of between about 5 and 25 mols of hydrogen per mol of polycondensation product at a pressure between about 50 and 1000 p.s.i.g. and a space velocity between about 0.1 and 10 liquid volumes of polycondensation product/hour/volume of catalyst, fractionating the hydrocracking products, and recovering durene and pseudocumene therefrom.

References Cited in the file of this patent

UNITED STATES PATENTS

| | | |
|---|---|---|
| 2,338,973 | Schmerling | Jan. 11, 1944 |
| 2,368,939 | Martin et al. | Feb. 6, 1945 |
| 2,422,318 | Sturrock et al. | June 17, 1947 |
| 2,597,159 | May et al. | May 20, 1952 |
| 2,761,885 | DeJong et al. | Sept. 4, 1956 |
| 2,819,322 | Fetterly | Jan. 7, 1958 |